Figure 3:
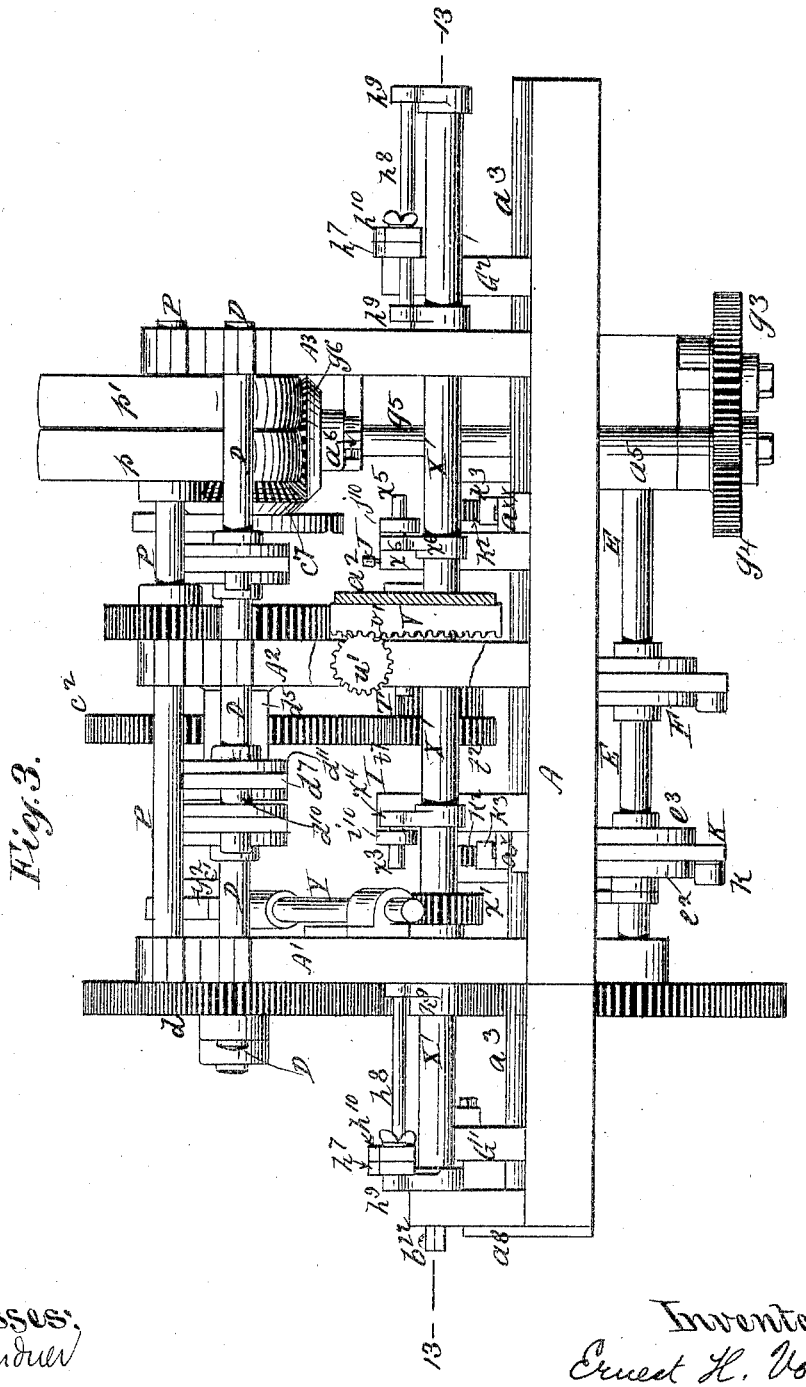

No. 783,808. PATENTED FEB. 28, 1905.
E. H. VOGEL.
WIRE TWISTING MECHANISM.
APPLICATION FILED JUNE 20, 1904.
12 SHEETS—SHEET 1.
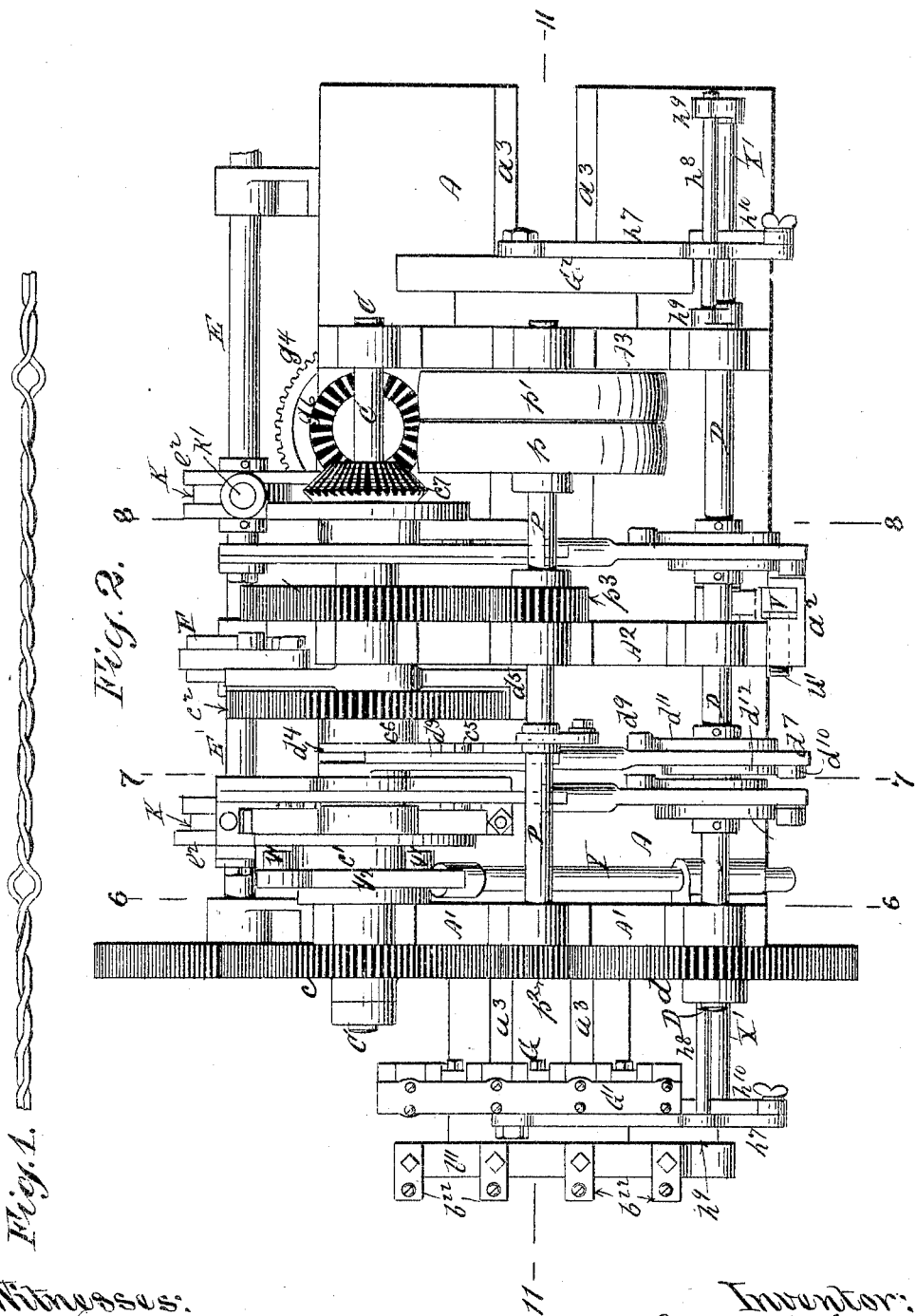
Witnesses:
Inventor:
Ernest H. Vogel No. 783,808. PATENTED FEB. 28, 1905.
E. H. VOGEL.
WIRE TWISTING MECHANISM.
APPLICATION FILED JUNE 20, 1904.

12 SHEETS—SHEET 2.

Witnesses:
D. W. Gardner
G. E. Leonn.

Inventor:
Ernest H. Vogel
By his Attorney
Geo. W. Miatt

No. 783,808. PATENTED FEB. 28, 1905.
E. H. VOGEL.
WIRE TWISTING MECHANISM.
APPLICATION FILED JUNE 20, 1904.

12 SHEETS—SHEET 3.

No. 783,808. PATENTED FEB. 28, 1905.
E. H. VOGEL.
WIRE TWISTING MECHANISM.
APPLICATION FILED JUNE 20, 1904.

12 SHEETS—SHEET 4.

Witnesses:
W. W. Gardner
G. E. Loren

Inventor:
Ernest H. Vogel
By his Attorney
Geo. Wm. Miatt

No. 783,808. PATENTED FEB. 28, 1905.
E. H. VOGEL.
WIRE TWISTING MECHANISM.
APPLICATION FILED JUNE 20, 1904.
12 SHEETS—SHEET 5.
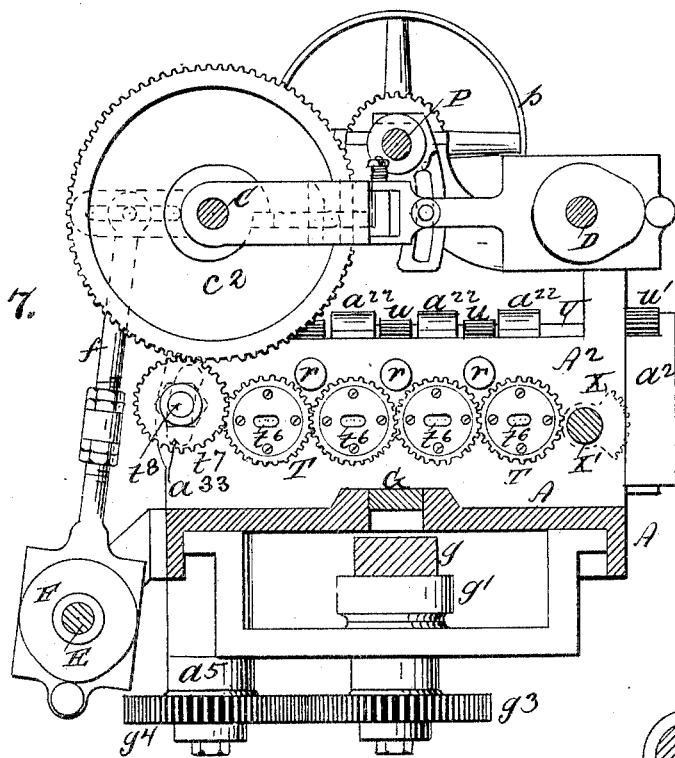
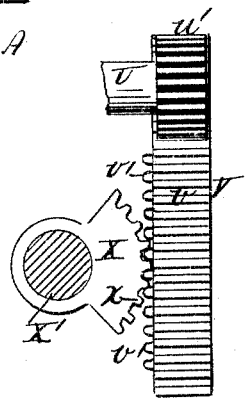
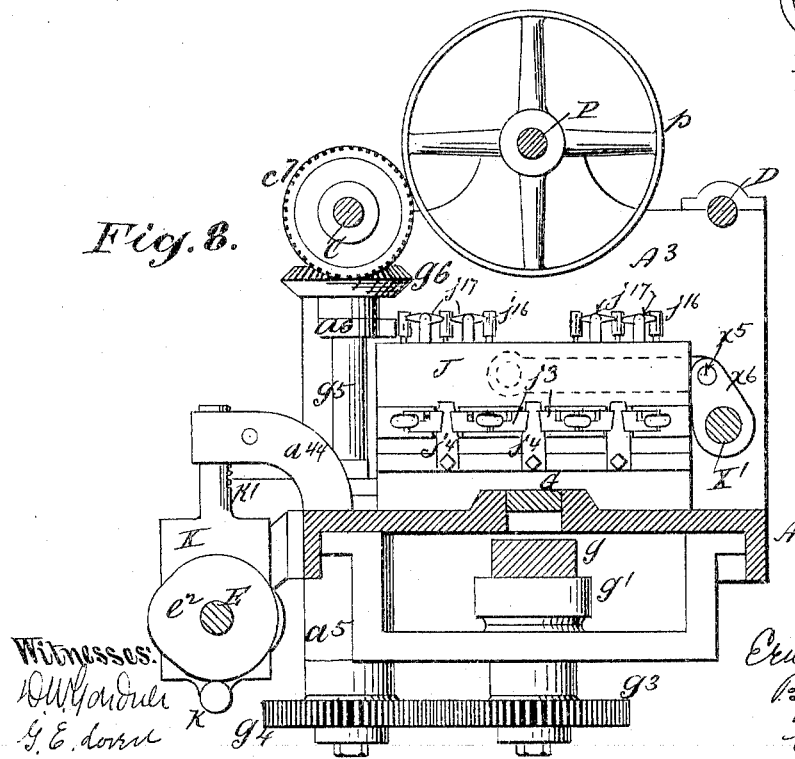
Witnesses.
Inventor:
Ernest H. Vogel
By his Attorney
Geo. W. Miatt

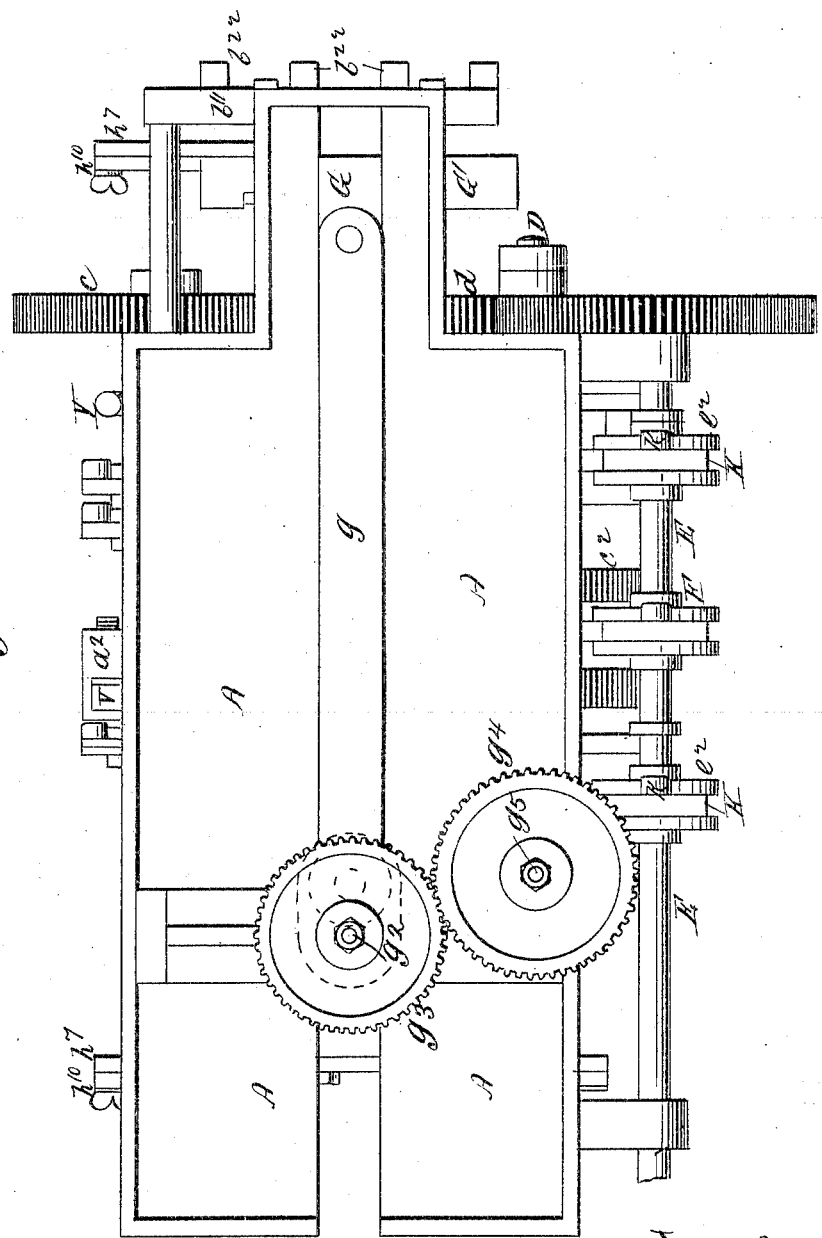

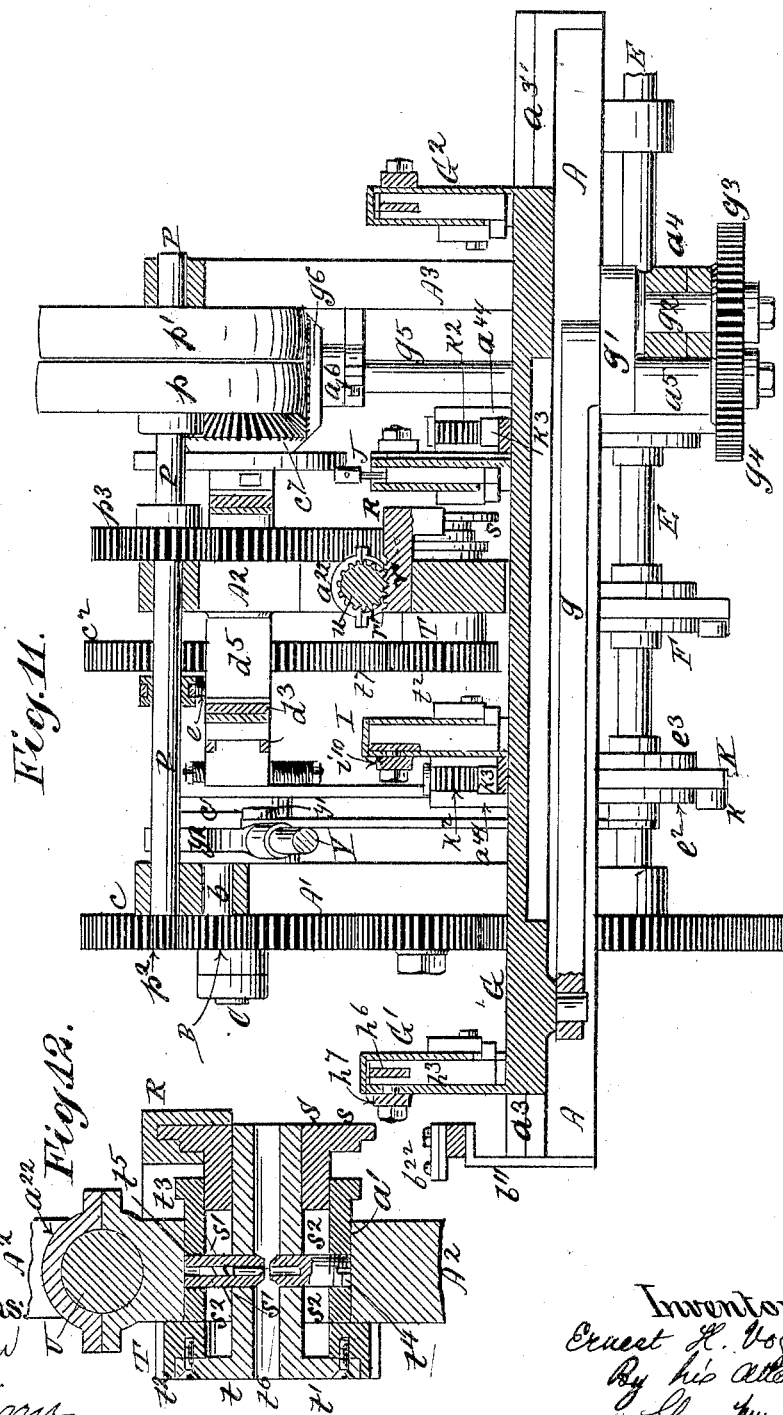

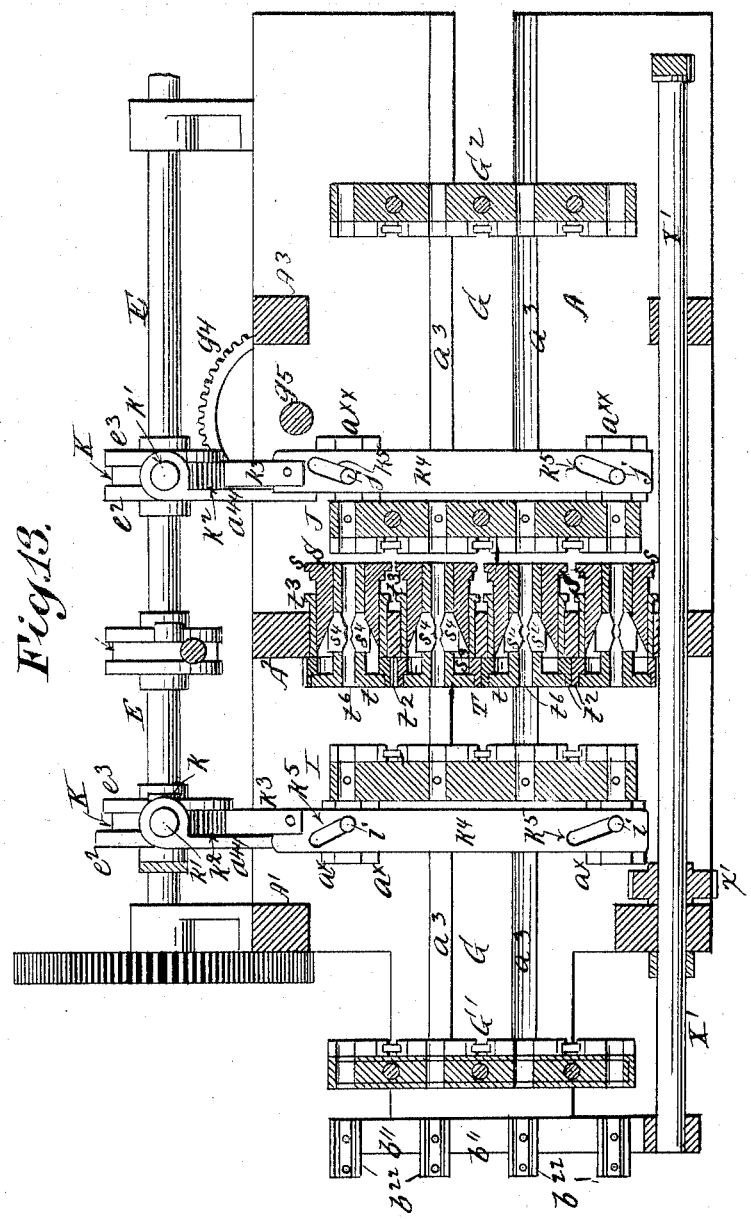

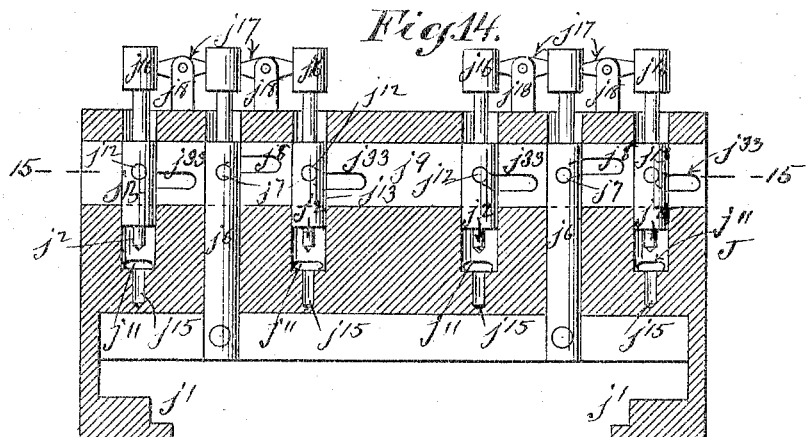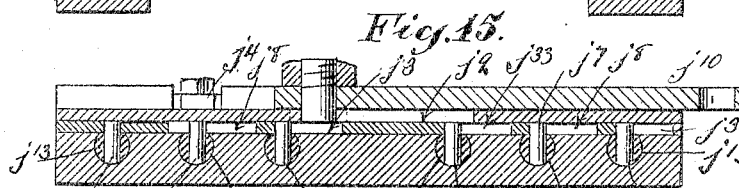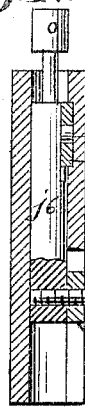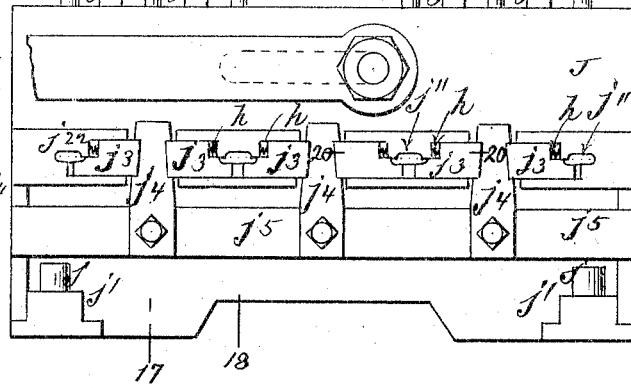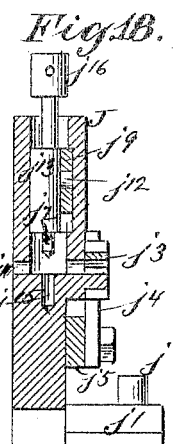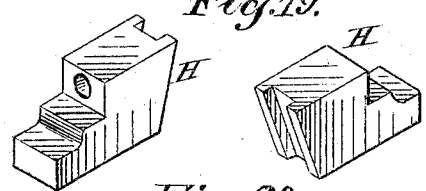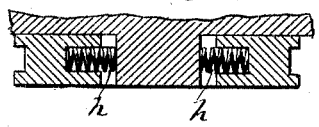

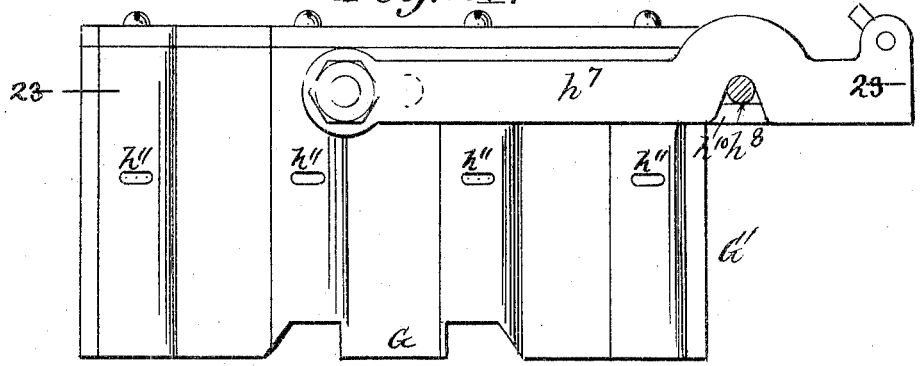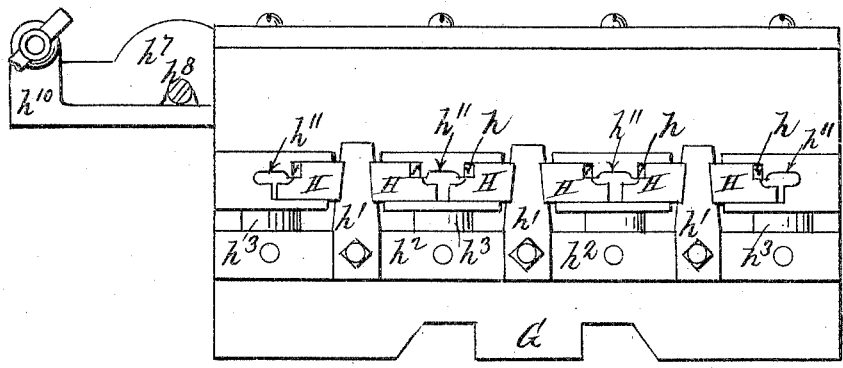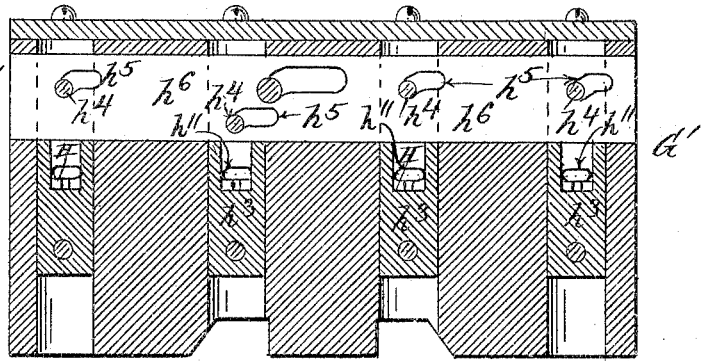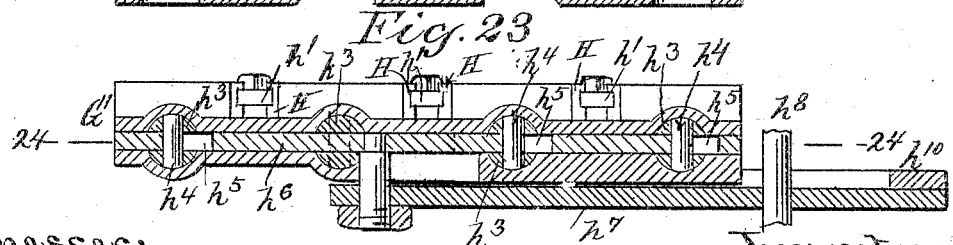

No. 783,808. PATENTED FEB. 28, 1905.
E. H. VOGEL.
WIRE TWISTING MECHANISM.
APPLICATION FILED JUNE 20, 1904.
12 SHEETS—SHEET 11.
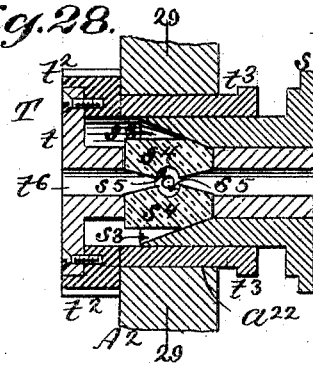
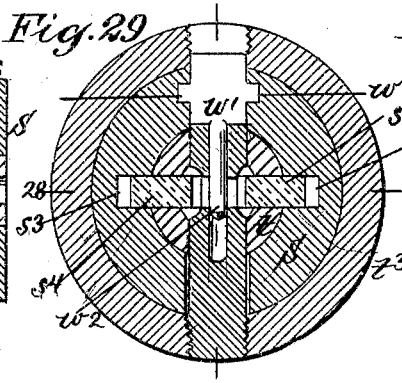
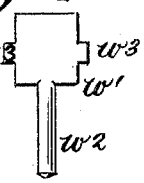
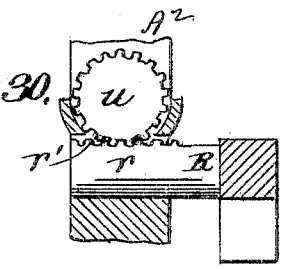
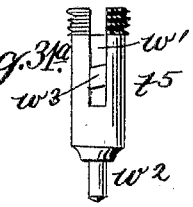
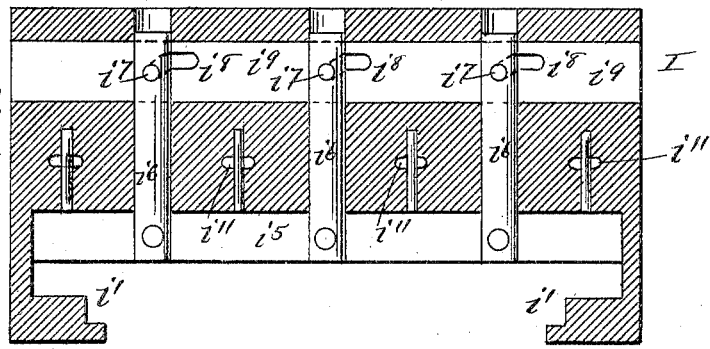
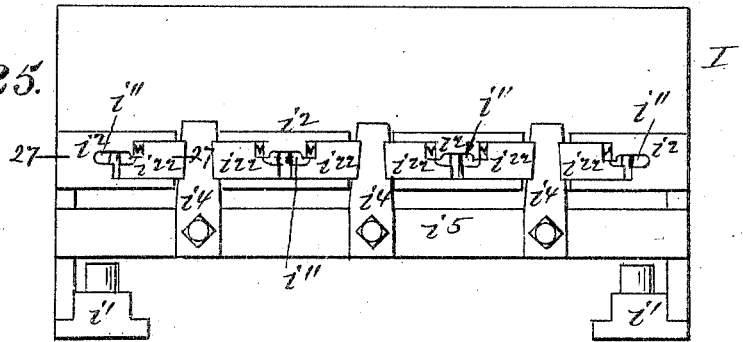
Witnesses:
Inventor:
Ernest H. Vogel No. 783,808. PATENTED FEB. 28, 1905.
E. H. VOGEL.
WIRE TWISTING MECHANISM.
APPLICATION FILED JUNE 20, 1904.
12 SHEETS—SHEET 12.
Fig.37. Fig.32. Fig.35.
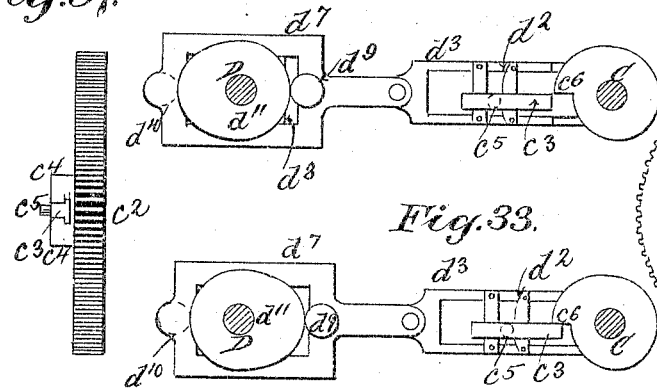 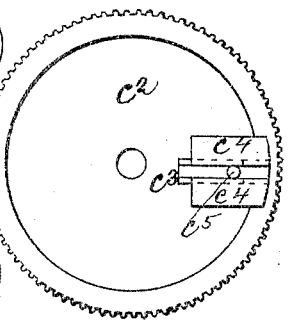
Fig.33.
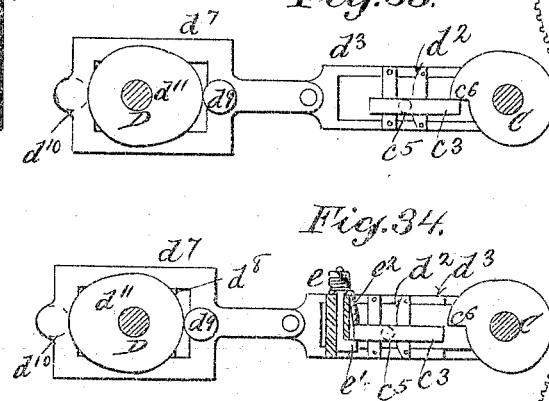
Fig.34. Fig.36.
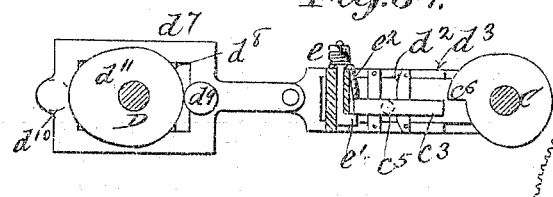 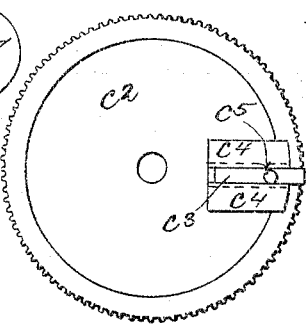
Fig.38.
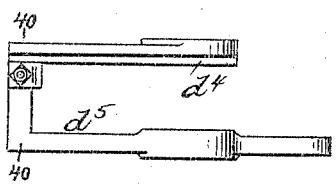
Fig.39.
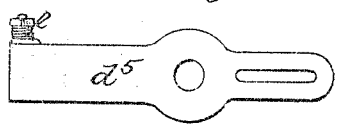
Fig.40.
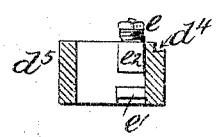
Witnesses:
D. W. Gardner
G. E. Lowe
Inventor:
Ernest H. Vogel
By his Attorney
Geo. Wm. Miatt No. 783,808. Patented February 28, 1905.

UNITED STATES PATENT OFFICE.

ERNEST H. VOGEL, OF NEW YORK, N. Y., ASSIGNOR TO EDWARD SCHRENKEISEN, OF NEW YORK, N. Y.

WIRE-TWISTING MECHANISM.

SPECIFICATION forming part of Letters Patent No. 783,808, dated February 28, 1905.

Application filed June 20, 1904. Serial No. 213,331.

*To all whom it may concern:*

Be it known that I, ERNEST H. VOGEL, a citizen of the United States, residing in the borough of Brooklyn, city of New York, county of Kings, and State of New York, have invented certain new and useful Improvements in Wire-Twisting Mechanism, of which the following is a specification.

My invention relates to mechanism for making twisted-wire straps such as are used for reinforcing and binding wooden boxes and other packages. These twisted-wire straps are made with loops or eyes at prescribed distances apart for the insertion of nails, staples, or other securing devices. Heretofore the sections or lengths of strap between adjoining securing-eyes have been formed successively one at a time, the twisting mechanism being reversed at each alternate operation, so that adjoining sections or lengths were convoluted in opposite directions.

The main object of my invention is to double the speed and capacity of the strap-making mechanism by rotating the twisters continuously in one direction and by twisting two sections of strap each in an opposite direction simultaneously, substantially as hereinafter set forth.

Another feature of my invention consists in counteracting the tendency of the wire, owing to its resilience, to untwist slightly when released by overtwisting the wire and then partly untwisting it, so as to "set" the wire and relieve the tension of the twist while attaining the normal twist desired.

Still another feature of my invention consists in moving the feed end devices toward the central twisting device during the twisting operation, whereby the wire under treatment is held at a uniform tension, thereby insuring a perfect alinement and uniformity of convolution.

The invention consists in the construction and arrangements of parts hereinafter described and claimed specifically.

Figure 4:
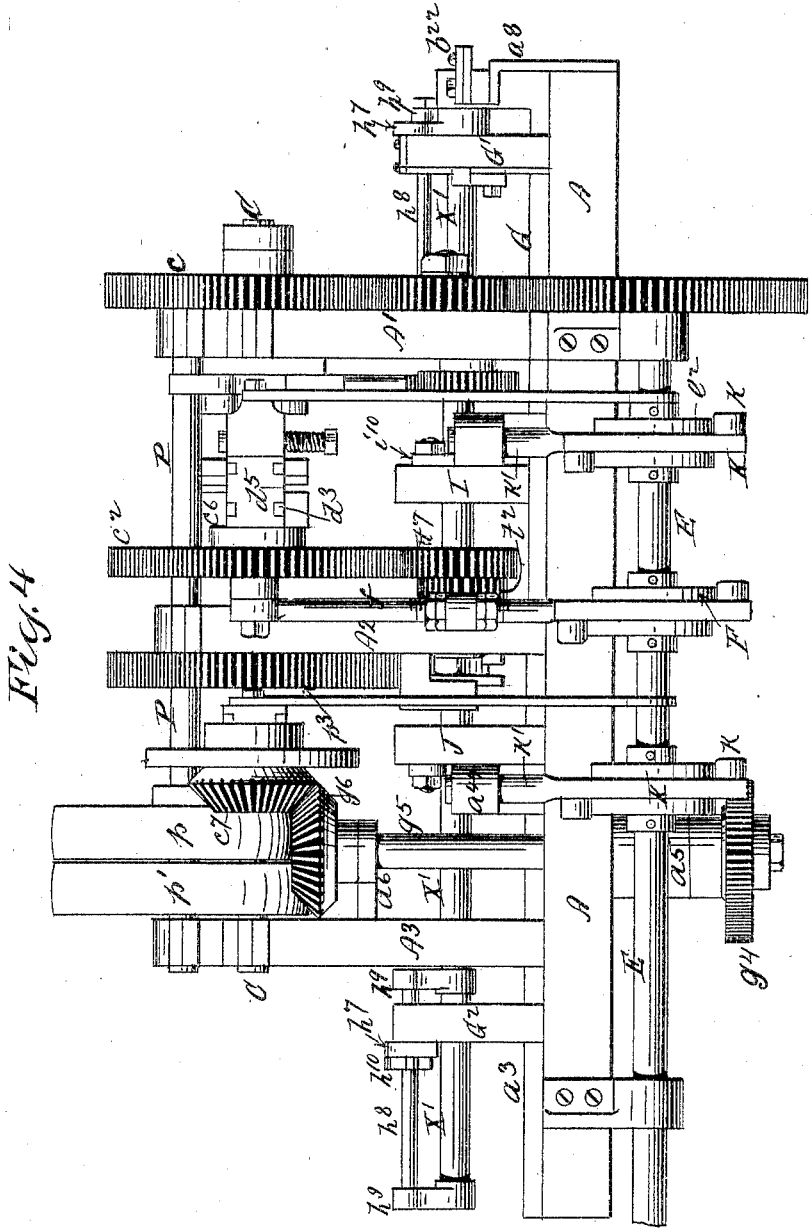
Figure 5:
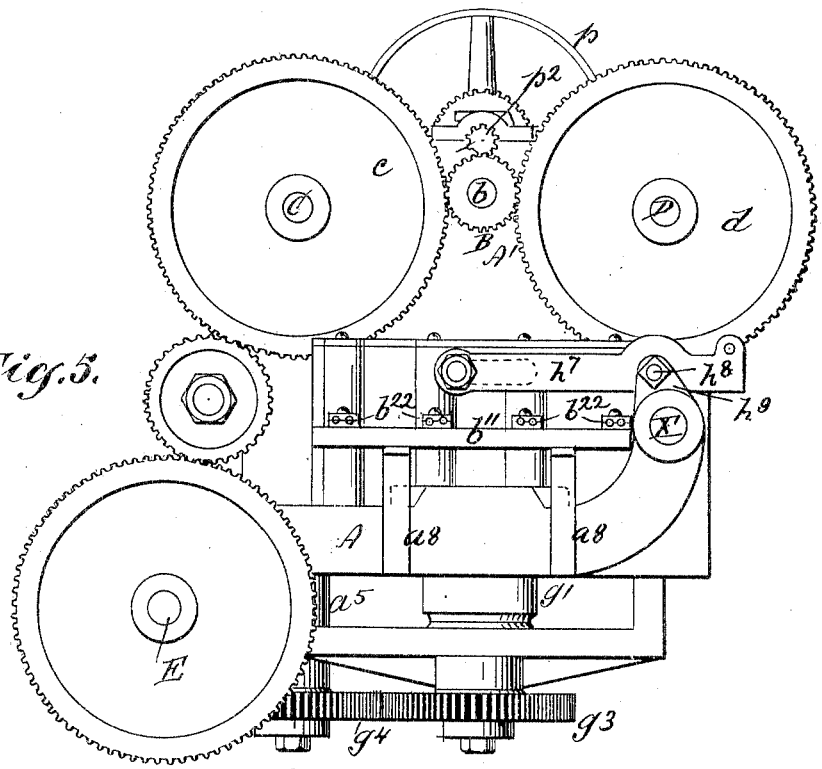
Figure 6:
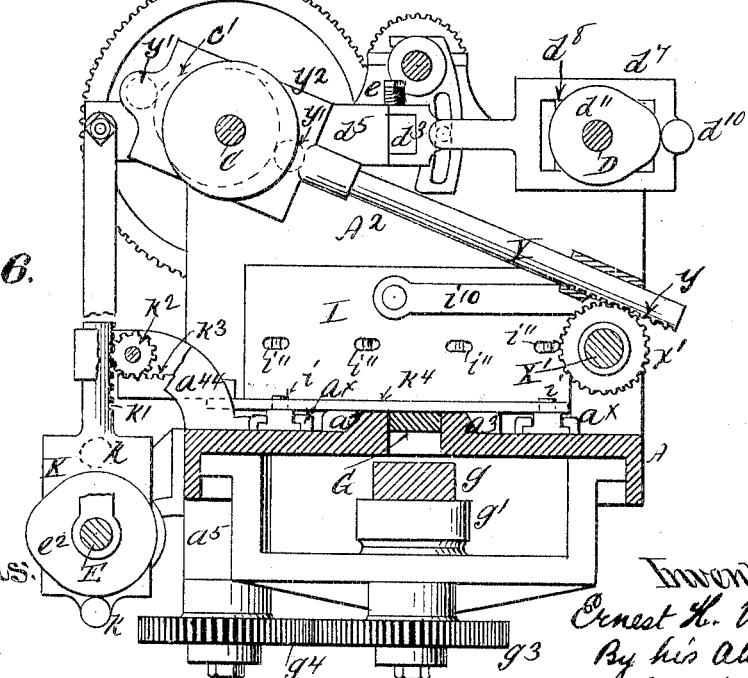

In the accompanying drawings, Figure 1 is an elevation of a portion of a twisted-wire strap such as heretofore manufactured and such as produced by my improved mechanism. Fig. 2 is a plan of the apparatus. Fig. 3 is an elevation of the right-hand side of the apparatus. Fig. 4 is an elevation of the left-hand side of the apparatus. Fig. 5 is a front end elevation of the apparatus. Fig. 6 is a sectional elevation upon plane of line 6 6, Fig. 2. Fig. 7 is a similar view upon plane of line 7 7, Fig. 2. Fig. 8 is a sectional elevation upon plane of line 8 8, Fig. 2; Fig. 9, a detail view of the twister-rack; Fig. 10, a view of the under side of the apparatus. Fig. 11 is a central vertical section upon plane of line 11 11, Fig. 2. Fig. 12 is a sectional detail of one of the twisters. Fig. 13 is a horizontal section upon plane of line 13 13, Fig. 3. Fig. 14 is a sectional detail, upon an enlarged scale, of the rear gang of holders. Fig. 15 is a horizontal section upon plane of line 15 15, Fig. 14. Fig. 16 is a rear elevation of the rear gang of holders shown in Fig. 14. Fig. 17 is a transverse section upon plane of line 17 17, Fig. 16. Fig. 18 is a transverse section upon plane of line 18 18, Fig. 16. Fig. 19 is an isometrical perspective of two of the movable clamping-jaws; Fig. 20, a sectional detail on plane of line 20 20, Fig. 16. Fig. 21 is an elevation, upon an enlarged scale, of the front end of the feed-carriage; Fig. 22, a rear view of the same; Fig. 23, a horizontal section upon plane of line 23 23, Fig. 21. Fig. 24 is a vertical section upon plane of line 24 24, Fig. 23. Fig. 25 is an elevation of the inner side of the first series of clamps for holding the wire while being twisted. Fig. 26 is a vertical section of the same. Fig. 27 is a sectional detail upon plane of line 27 27, Fig. 25. Fig. 28 is a section of one of the twisters, taken upon plane of line 28 28, Fig. 29. Fig. 29 is a section of one of the twisters, taken upon plane of line 29 29, Fig. 28. Fig. 30 is a sectional detail showing the means for operating the twister-clamp. Fig. 31 is a detail view of one of the twister-pins; Fig. 31ª, an elevation of the twister-pin guide. Figs. 32, 33, and 34 are diagrammatic views illustrating the operation of the mechanism whereby the twisters are rotated intermittently. Figs. 35 and 36 are views of the twister-gear, showing the different positions of the actuating-slide. Fig. 37 is an edge view of said gear. Fig. 38 is a plan of the sliding yoke-bracket; Fig. 39, a side elevation of the same; Fig. 40, a section upon plane of line 40 40, Fig. 38.

In the drawings, A represents the base-plate of the apparatus, having the standards $A'$ $A^2$ $A^3$ integral therewith.

P is the power-shaft, mounted in bearings on all three of the standards $A'$ $A^2$ $A^3$ and carrying the usual pulleys $p$ $p'$. The power-shaft also carries two pinions $p^2$ $p^3$, respectively, the first-named, $p^2$, meshing into an idler B, mounted on a stud $b$ on the front of the standard $A'$. The idler B engages with two driving-gears $c$ $d$, mounted on the forward ends of the shafts C and D, said idler rotating said gears and shafts in opposite directions, as is obvious by reference to Fig. 5. The shafts C and D are mounted upon the standards $A'$ $A^2$ $A^3$.

T T are a series of twisters, four of which are shown as used in the machine illustrated in the drawings, although the machine may be adapted to the use of any desired plural number of said twisters which are essentially duplicates of each other in construction and operation. Each twister consists of a central spindle $t$, to the front flange $t'$ of which is secured the gear $t^2$.

S is a sleeve fitting over the inner end of the spindle $t$ and formed at its rear with the annular flange $s$ for engagement with the rack-bar R. (Shown in detail in Fig. 30.) Over the sleeve S fits a bushing $t^3$, connected with the spindle $t$ by means of the screws $t^4$ $t^5$, the bushing $t^3$, supported in the bearing $a'$, formed directly in the standard $A^2$.

$t^6$ is a central aperture through which the wires to be twisted are fed. The inner ends of the screws $t^4$ $t^5$ project slightly into this passage, as will be seen by reference to Figs. 12 and 29, for the purpose of forming abutments against which the sides of the loop in the wire rest during formation. One of the screws $t^5$ is formed with a central bore and lateral slots for the accommodation of a pin $w'$, (shown in detail in Figs. 31$^a$,) the inner end of the other screw, $t^4$, being also recessed axially to receive the end $w^2$ of said pin $w'$. The head of the pin $w'$ is formed with lateral projections $w^3$, which engage with slots $s'$ in the sleeve S, which is formed with longitudinal recesses $s^2$, so as to straddle the screws $t^4$ $t^5$. The sleeve S is also formed with recesses $s^3$ at right angles to $s^2$ for the accommodation of the loop-formers $s^4$, which rest loosely in said recesses $s^3$, the rear walls of which latter are inclined or wedge-shaped, so that when the sleeve S is thrust inward by the rack-bar R the curved lips $s^5$ of the loop-formers $s^4$ will be thrust into the passage $t^6$, so as to confine the wire around the pin $w^2$. When the sleeve S is retracted by the rack-bar R, the loop-formers $s^4$ are forced backward laterally by the passage of the wire through the opening $t^6$.

The rack-bar R is formed with lateral arms $r$, formed with rack-teeth $r'$, which engage with pinions $u$, formed on the transverse shaft U, journaled directly in the standard $A^2$, being held thereon by caps $a^{22}$. The rack-arms $r$ project through the recesses formed for their reception in the standard $A^2$.

On one end of the shaft U is a pinion $u'$, which engages with the teeth $v$ on a rack-slide V, resting loosely in the box $a^2$, secured to the standard $A^2$, said rack-slide V being also formed with a series of rack-teeth $v'$ at right angles to those first named, as will be seen by reference to Fig. 9, the said teeth $v'$ engaging with the teeth $x$ upon a segment X, secured to the longitudinal rock-shaft $X'$, which is rocked intermittently by reason of the engagement of its pinion $x'$ with the teeth $y$ of the rack-rod Y, which is in turn actuated by a cam $c'$ upon the shaft C, which cam $c'$ bears upon rollers $y'$, attached to the yoke $y^2$ upon the rack-rod Y, as will be understood by reference to Fig. 6.

The gears $t^2$ of the twisters T mesh with those next adjoining, as will be seen by reference to Fig. 7, so that they rotate in opposite directions with relation to each other. The end gear $t^2$ of the series is in engagement with a driving-pinion $t^7$, mounted loosely on a stud $t^8$, adjustable within the slot $a^{33}$ in the standard $A^2$. The driving-pinion $t^7$ meshes with the gear $c^2$, which is loose upon the shaft C. The twisters T, driving-pinion $t^7$, and gear $c^2$ travel intermittently, but always in the same direction, there being no reverse motion, as heretofore.

The gear $c^2$ is thrown into engagement with the shaft C by the following mechanism: $c^3$ is a slide resting between bearings $c^4$ on the face of the gear $c^2$ and carrying a pin $c^5$. When this pin $c^5$ is in engagement with the shoulder $c^6$, rigidly secured to the shaft C, the gear $c^2$ is rotated. The pin $c^5$ is thrown into and out of engagement with the shoulder $c^6$ by reason of its engagement with the side walls of the slot $d^2$ on the bifurcated slide $d^3$, the rear ends of which slide rest in grooves $d^4$, formed in the supporting-block $d^5$, which is suspended on the shaft C. The bifurcated slide $d^3$ is pivotally connected with the yoke $d^7$, which straddles a block $d^8$, resting loosely on the shaft D. Mounted on the yoke $d^7$ are rollers $d^9$ $d^{10}$, engaging cams $d^{11}$ $d^{12}$, by which the yoke is reciprocated continuously owing to the continuous rotation of the shaft D, to which the cams $d^{11}$ and $d^{12}$ are secured. It will be seen that the cams $d^{11}$ $d^{12}$ are parallel and that their eccentric portions extend in the same direction, as do also their concentric portions, which latter are equal to one-half the circumference of each cam. Thus the cam $d^{11}$, acting upon the roller $d^9$, pushes the bifurcated slide $d^3$ forward, acting on the pin $c^5$ to thrust the forward end of the slide $c^3$ into the path of the shoulder $c^6$, as shown in Fig. 33, on the shaft C. As a result, it being remembered that the pin $c^5$ and slide $c^3$ are attached to the gear $c^2$, the latter is rotated with the shaft C for one-half a revolution, thereby actuating the twisters T. At the end of said half-revolution the slide $c^3$ is withdrawn from the shoulder $c^6$, the rollers $d^9 d^{10}$ passing over the concentric portions of the cams $d^{11} d^{12}$ with the yoke $d^7$ in the positions shown in Figs. 32 and 34, the wheel $c^2$ being held against turning with the shaft C by reason of the engagement of the inner end of the slide $c^3$ with the shoulder $e'$ of the spring-buffer $e$, as shown in detail in Fig. 34, said spring-buffer $e$ being mounted on the bracket $d^5$. The buffer $e$ is provided with the spring-detent $e^2$, which yields to allow the descent of the end of the slide $c^3$ onto the shoulder $e'$ and then springs over the same to retain it in position. The spring-buffer $e$, being mounted, as before stated, on the bracket $d^5$, it is obvious that the forward thrust of the cam $d^{11}$ will force the slide $c^3$ beyond the shoulder $e'$ and enter the path of the shoulder $c^6$. Should the latter encounter the slide $c^3$ before the said slide clears the shoulder $e'$, the latter yields sufficiently to release the slide. The retractile movement of the yoke $d^7$ is effected by reason of the engagement of the eccentric portion of the cam $d^{12}$ with the roller $d^{10}$.

It will be remembered that the shafts C and D travel at the same rate of speed in opposite directions, as will be understood by reference to Fig. 5, and that the slide $c^3$ is advanced and retracted once for each revolution of the shaft D. Consequently owing to the arrangement of the parts above described, the twister-actuating gear $c^2$ makes only a half-revolution to every revolution of the shafts C and D, the feeding of the wire being effected while the gear $c^2$ is at rest, as hereinafter described.

In practice in order to set the wire and counteract the natural tendency to spring back or reopen I overtwist the wire slightly and then retract the twisters to the normal position. This is accomplished by connecting the block $d^5$ through the medium of a rod $f$ with the cam F, situated upon the shaft E, extending longitudinally at the rear of the machine, the thrust of the cam being but slight and being timed to rock the block $d^5$ immediately after the engagement of the slide $c^3$ with the spring buffer-shoulder $e'$, the buffer $e$ yielding sufficiently to allow of this retractile movement, which is equivalent to only a very small fraction of a circle. The rod $f$ is pivotally connected to the block $d^5$ by means which are adjustable, so as to regulate the desired retractile movement with accuracy.

The feeder-carriage G rests upon ways $a^3$, formed longitudinally in the bed of the machine. It is reciprocated intermittently through the pitman $g$ by the crank $g'$, secured to the vertical shaft $g^2$, mounted in the bearing $a^4$ of the frame, said shaft $g^2$ being provided with a gear $g^3$, which meshes with a gear $g^4$ of the same diameter secured to the end of the vertical shaft $g^5$, mounted in the bearing $a^5$ and the bearing $a^6$ upon the standard $A^3$. A beveled gear $g^6$ on the upper end of the shaft $g^5$ meshes into a corresponding gear $c^7$, mounted upon the shaft C, to which it is coupled or uncoupled by means similar to that described for operating the gear $c^2$ intermittently, the difference being that the parts are so timed that the feed-carriage is reciprocated while the said gear $c^2$ is at rest.

Situated at opposite extremities of the feed-carriage G are the standards $G' G^2$, in which the gripping-jaws and operating parts are mounted, a pair of jaws being provided in each standard for each twister T. The wire-clamping jaws H are forced together against the resistance of the retractile springs $h$ by wedges $h'$, attached to a cross-bar $h^2$, said cross-bar being raised and lowered by rods $h^3$, having pins $h^4$, which rest in cam-grooves $h^5$ in the cam-plate $h^6$, said cam-plate being reciprocated intermittently at the proper time by a rod $h^7$, which straddles a rock-bar $h^8$, mounted between short arms $h^9$ upon the rock-shaft $X'$, the rock-bars admitting of the movement of the feed-carriage G without interfering with the connections between the rock-lever $X'$ and the cam-plate $h^6$.

$h^{10}$ is a supplementary arm secured to the outer end of each cam-plate rod $h^7$ and straddling the lower side of the rock-rod $h^8$, as will be understood by reference to Fig. 22.

Each standard $G' G^2$ is formed with a series of grooved upper bearing or anvil surfaces $h^{11} h^{11}$ to sustain the wires against the action of the jaws. This description applies to both end standards $G' G^2$.

Supported on brackets $a^8$ on the extreme front end of the base of the machine is a cross-bar $b^{11}$, upon which are mounted guides $b^{22}$ for the support of the wires as they are fed to the jaws H H in the first feeder-standard G, as will be seen by reference to Figs. 2 and 5.

There are two series of clamping-jaws arranged to hold the wire while it is being acted upon centrally by the twisters T, the first of the series being mounted in the standard I, the base $i'$ of which rests between ways $a^\times$ on the bed A, so as to be slidable thereon, and is situated in front of the standard $A^2$, in which the twisters are mounted, while the other series of holders are mounted in the standard J, the base $j$ of which is in like manner supported movably upon ways $a^{\times\times}$ on the base A and is situated at the rear of the standard $A^2$. The movement of the standards I and J toward and from the standard $A^2$ and twisters T is for the purpose of compensating for the amount of wire taken up by the twist and is designed to keep the wire under constant uniform tension during the operation of twisting the same and is effected as follows: the mechanism for each standard I J being the same in construction and operation, excepting that the motion is reversed, so that the standards I and J travel simultaneously toward and from each other. Such mechanism consists in each case of cams $e^2$ $e^3$, mounted upon the cam-shaft E at the rear of the machine and acting upon rollers $k$ upon yokes K, provided with racks $k'$, which engage with pinions $k^2$ upon brackets $a^{44}$, secured to the bed of the machine, the pinions $k^2$ engaging in turn with horizontal racks $k^3$, secured to cam-plates $k^4$, having inclined cam-slots $k^5$, which engage with studs $i$ $j$ upon the bases of the standards I J. This will be understood by reference to Figs. 6 and 13, the latter figure showing the convergence in opposite directions of the cam-slots $k^4$.

Referring to the movable standard I, $i'''$ represents transverse grooves or recesses through each of which two wires are passed to the twisters and through and beyond the twisters to the jaws of the movable standard J. Stationary clamping-jaws $i^2$ are situated upon the inner face of the movable standard I, while the movable jaws $i^{22}$ rest between guides formed on said inner surface and are controlled by wedges $i^4$, attached to a cross-bar $i^5$, said cross-bar being raised and lowered by rods $i^6$, having pins $i^7$, which rest in cam-grooves $i^8$, formed in the cam-plate $i^9$, said cam-plate being reciprocated intermittently at the proper time by a rod $i^{10}$, connecting said cam-plate pivotally with a stud $x^3$ upon the arm $x^4$, secured to the rock-shaft X', said stud being of sufficient length to accommodate the slight extent of motion imparted to the standard I. In like manner the movable standard J is formed with transverse grooves or recesses $j^{11}$ for the reception and passage of the wires. In this case, however, the pins $j^2$ are movable, so as to be raised out of the way while the wires are being fed, as hereinafter described. Stationary clamping-jaws $j^{22}$ are situated upon the inner or front face of the standard J, while the movable jaws $j^3$ rest between guides formed on said inner face and are controlled by wedges $j^4$, attached to the cross-bar $j^5$, said cross-bar being raised and lowered by rods $j^6$, having pins $j^7$, which rest in cam-grooves $j^8$, formed in the cam-plate $j^9$, said cam-plate $j^9$ reciprocated intermittently at the proper time by a rod $j^{10}$, connecting said cam-plate pivotally with a stud $x^5$ upon the arm $x^6$, secured to the rock-shaft X', said stud being of sufficient length to accommodate the slight motion imparted to the standard J. Additional cam-slots $j^{33}$ are formed in the cam-plate $j^9$ intermediate between the grooves $j^8$ and engaging with studs $j^{12}$ upon plungers $j^{13}$, which carry the pins $j^2$, which enter the recesses $j^{15}$, formed in the body of the standard J when the plungers are lowered by the cam-plate $j^9$. In order to preserve the accurate alinement of the pins and support the latter with relation to each other, I form the plungers with heads $j^{16}$, rocking bearings $j^{17}$, mounted pivotally upon posts $j^{18}$ upon the top of the standard J.

It will be seen that by my construction and arrangement of parts I am enabled to rotate the twisters intermittently in the same direction except for the slight reversal resorted to in order to set the twisted wire and prevent its springing or opening after release. I also twist double the quantity of wire as compared with other machines, since I twist two sections between loops simultaneously in opposite directions, and thereby double the capacity of the machine, besides making a superior binder of close uniform twist. This latter result is contributed to largely by the feature of holding the wire taut while being twisted by mechanism which moves the end clamps inward toward the twisters during the operation thereof, compensating for the amount of wire taken up by the twist and insuring the perfect alinement of the wire during all parts of the operation.

What I claim, and desire to secure by Letters Patent, is—

1. In apparatus of the character designated, a wire-twister consisting of a central spindle $t$, formed with the flange $t'$, the gear $t^2$, secured thereto, the sleeve S, formed with the flange $s$, for engagement with the rack-bar R, said rack-bar and means for actuating the same substantially in the manner and for the purpose described.

2. In apparatus of the character designated, a wire-twister consisting of the spindle $t$, formed with the flange $t'$, the gear $t^2$, secured thereto, the sleeve S formed with the flange $s$, for engagement with the rack-bar R, said rack-bar and means for actuating it and the bushing $t^3$, and the screws $t^4$, $t^5$, connecting said bushing with the spindle S, for the purpose and substantially in the manner described.

3. In apparatus of the character designated, a wire-twister consisting of the spindle $t$, formed with the flange $t'$, the gear $t^2$, secured thereto, the sleeve S, formed with the flange $s$, and inclined slot $s'$, and recesses $s^2$ and $s^3$, loop-formers $s^4$, the bushing $t^3$, the screws $t^4$, $t^5$, and the pin $w'$, arranged and operating substantially in the manner and for the purpose set forth.

4. In apparatus of the character designated, a wire-twister consisting of the spindle $t$, formed with the flange $t'$, and central longitudinal passage $t^6$, the gear $t^2$, secured thereto, the sleeve S formed with the flange $s$, inclined slots $s'$, and recesses $s^2$, $s^3$, loop-formers $s^4$, the bushing $t^3$, the screws $t^4$, $t^5$, the latter recessed to receive the pin-piece $w'$, formed with the lugs $w^3$, and pin $w^2$, the rack-bar R engaging with the annular flange $s$, on the spindle S, and means for actuating said rack in the manner and for the purpose set forth.

5. In apparatus of the character designated, the combination with the wire-twister T, having the gear $t^2$, and spindle S, formed with the flange $s$, and internal means for holding the wire, of the rack-bar R, formed with the lateral toothed arm $r$, and the transverse shaft U, provided with the pinion $u$, for engagement with said toothed arm, together with means for rotating said shaft U, intermittently in opposite directions for the purpose set forth.

6. In apparatus of the character designated, the combination with the wire-twister T, having the gear $t^2$, and spindle S formed with the flange $s$, and internal means for holding the wire, of the rack-bar R formed with the lateral toothed arm $r$, the transverse shaft U provided with the pinions $u$ and $u'$, the rack-slide V, formed with the teeth $v$, and $v'$, the segment X formed with the teeth $x$, and the rock-shaft X′, arranged and operating substantially in the manner and for the purpose described.

7. In apparatus of the character designated, the combination with the twister T, of a rack-bar formed with a lateral toothed arm $r$, a transverse shaft U, provided with the pinions $u$, $u'$, the rack-slide V, formed with the teeth $v$ and $v'$, the segment X formed with the teeth $x$, the rock-shaft X′, pinion $x'$, the rack-rod Y, formed with the teeth $y$, and yoke $y^2$, carrying the rollers $y'$, the cam $c'$, the shaft C, together with means for throwing said cam $c'$, into and out of engagement with said shaft C, for the purpose set forth.

8. In apparatus of the character designated, the combination with the shafts C and D wheels $c$ and $d$, and pinion $b$ of the wheel $c^2$, slide and stud $c^3$, $c^5$, shoulder $c^6$ slide $d^3$ formed with the groove $d^2$, yoke $d^7$ and cams $d^{11}$, $d^{12}$, the whole arranged and operating substantially in the manner and for the purpose described.

9. In apparatus of the character designated, the combination with the shafts C and D, wheels $c$, $d$, and pinion $b$, of the wheels $c^2$, slide and stud $c^3$, $c^5$, shoulder $c^6$, slide $d^3$, formed with the groove $d^2$, buffer-shoulder $e$, $e'$, yoke $d^7$, and cams $d^{11}$, $d^{12}$, arranged and operating substantially in the manner and for the purpose described.

10. In apparatus of the character designated, the combination with the shafts C and D, wheels $c$ and $d$, and pinion $b$, of the wheel $c^2$, slide and stud $c^3$, $c^5$, shoulder $c^6$, slide $d^3$, formed with the grooves $d^2$, buffer-shoulder $e$, $e'$, yoke $d^7$, supporting-block $d^5$, formed with the grooves $d^4$, cams $d^{11}$, $d^{12}$, and rollers $d^9$, $d^{10}$, arranged and operating substantially in the manner and for the purpose described.

11. In apparatus of the character designated, the combination with the shafts C and D, wheels $c$, $d$, pinion $b$, of the wheel $c^2$, slide and stud $c^3$, $c^5$, shoulder $c^6$, slide $d^3$, formed with the groove $d^2$, buffer-shoulder $e$, $e'$, yoke $d^7$, supporting-block $d^5$, formed with the grooves $d^4$, cams $d^{11}$, $d^{12}$, and rollers $d^9$, $d^{10}$, driving-pinion $t^8$, and twisters T, arranged and operating substantially in the manner and for the purpose described.

12. In apparatus of the character designated, the combination with the twisters T, driving-pinion $t^7$, and wheel $c^2$, of the block $d^5$, rod $f$, and cam F, for the purpose set forth.

13. In apparatus of the character designated, the combination with the shafts C and D, wheels $c$, $d$, and pinion $b$, of the wheel $c^2$, slide and stud $c^3$, $c^5$, shoulder $c^6$, slide $d^3$, formed with the groove $d^2$, buffer-shoulder $e$, $e'$, yoke $d^7$, supporting-block $d^5$, formed with the grooves $d^4$, cams $d^{11}$, $d^{12}$, and rollers $d^9$, $d^{10}$, driving-pinion $t^7$, twisters T rod $f$, and cam F, for the purpose set forth.

14. In apparatus of the character as designated, the wire-clamping jaws J, retractile springs $h$, wedges $h'$, cross-bar $h^2$, rods $h^3$, pins $h^4$, plate $h^6$, formed with the cam-grooves $h^5$, and means for reciprocating said plate $h^6$, for the purpose and substantially in the manner set forth.

15. In apparatus of the character designated, the wire-clamping jaws H, retractile spring $h$, wedges $h'$, cross-bar $h^2$ rods $h^3$, pins $h^4$, plate $h^6$, formed with the cam-grooves $h^5$, rod $h^7$, rock-bar $h^8$, short arms $h^9$, and rock-shaft X′ arranged and operating substantially in the manner and for the purpose described.

16. In apparatus of the character designated, the wire-clamping jaws H, retractile springs $h$, anvil-surfaces $h^8$, wedges $h'$, cross-bar $h^2$, rods $h^3$, pins $h^4$, cam-plate $h^6$, formed with the inclined grooves $h^5$, and means for reciprocating said cam-plate, whereby the wires are clamped against said anvil-surfaces $h^8$, during the twisting operation and then released substantially as set forth.

17. In an apparatus such as designated, the combination of the shaft E, cams $e^2$, $e^3$, rollers K, yokes K, racks $k'$, pinions $k^2$, brackets $a$, plate $k^4$, having racks $k^3$, and inclined slots $k^5$ for engagement with studs on the bases of the standards substantially as set forth.

18. In apparatus such as designated, the combination of the clamping-jaws $i^2$, the movable jaws $i$, wedges $i^4$, cross-bar $i^5$, rods $i^6$, pins $i^7$, plate $i^9$, formed with the grooves $i^8$, rod $i^{10}$, stud $x^3$, arm $x^4$, and rock-shaft X′, the whole arranged and operating substantially in the manner and for the purpose described.

19. In apparatus of the character designated, the combination of the movable pins $j^2$, stationary clamping-jaws $j$ movable jaws $j^3$, wedges $j^4$, cross-bar $j^5$, rods $j^6$, pins $j^7$, plate $j^9$, formed with grooves $j^8$, $j^{88}$, studs $j^{12}$, plungers $j^{13}$, pins $j^{12}$, recesses $j^{15}$, rod $j^{10}$, stud $x^5$, arm $x^6$, and rock-shaft X′, arranged and operating substantially in the manner and for the purpose set forth.

20. In apparatus of the character designated, the combination of the movable pins $j^2$, stationary clamping-jaws $j$, movable jaws $j^3$, edges $j^4$, cross-bar $j^5$, rods $j^6$, pins $j^7$, plate $j^9$, formed with grooves $j^8$, $j^{11}$, studs $j^{12}$, plungers $j^{13}$, with the heads $j^{16}$, the pivoted bearings $j^{18}$, pins $j^{14}$, recesses $j^{15}$, and rod $j^{10}$, stud $x^5$, arm $x^6$, and rock-shaft $X'$, arranged and operating substantially in the manner and for the purpose set forth.

ERNEST H. VOGEL.

Witnesses:
D. W. GARDNER,
G. E. GOVEN